US012766524B2

(12) United States Patent
Kamiya et al.

(10) Patent No.: US 12,766,524 B2
(45) Date of Patent: Oct. 20, 2026

(54) METHOD FOR SELECTIVELY RECOVERING ARSENIC- CONTAINING COPPER MINERAL, AND FLOTATION AGENT USED IN SAME

(71) Applicant: Japan Organization for Metals and Energy Security, Tokyo (JP)

(72) Inventors: Taro Kamiya, Tokyo (JP); Kosuke Konno, Tokyo (JP); Tatsuhiro Ono, Tokyo (JP); Refilwe Sandra Magwaneng, Tokyo (JP); Yoshinari Baba, Miyazaki (JP); Kuniko Atae, Miyazaki (JP)

(73) Assignee: Japan Organization for Metals and Energy Security, Tokyo (JP)

( * ) Notice: Subject to any disclaimer, the term of this patent is extended or adjusted under 35 U.S.C. 154(b) by 776 days.

(21) Appl. No.: 18/022,986

(22) PCT Filed: Jul. 15, 2021

(86) PCT No.: PCT/JP2021/026559
§ 371 (c)(1),
(2) Date: Feb. 23, 2023

(87) PCT Pub. No.: WO2022/044599
PCT Pub. Date: Mar. 3, 2022

(65) Prior Publication Data

US 2023/0338971 A1 Oct. 26, 2023

(30) Foreign Application Priority Data

Aug. 27, 2020 (JP) ................................ 2020-143568

(51) Int. Cl.
*B03D 1/012* (2006.01)

(52) U.S. Cl.
CPC .......... *B03D 1/012* (2013.01); *B03D 2201/02* (2013.01); *B03D 2203/04* (2013.01)

(58) Field of Classification Search
None
See application file for complete search history.

(56) References Cited

U.S. PATENT DOCUMENTS

2011/0094942 A1* 4/2011 Ochi ...................... C22B 30/04 209/12.1
2013/0004389 A1* 1/2013 Okamoto ........... C22B 15/0008 423/26

(Continued)

FOREIGN PATENT DOCUMENTS

JP S63-100961 A 5/1988
JP 2012-241249 A 12/2012

(Continued)

OTHER PUBLICATIONS

Orii et al., "Study of selective flotation of arsenic containing copper minerals with addition of sodium sulfite", Proceedings of Mining and Materials, 6:2 (2019), (Proceedings of the 2019 Fall Meeting, MMIJ).

(Continued)

*Primary Examiner* — Peter Keyworth
(74) *Attorney, Agent, or Firm* — Morgan, Lewis & Bockius LLP

(57) ABSTRACT

In order to decrease arsenic, which is a harmful substance, in a copper concentrate, provided is a method for selectively recovering an arsenic-containing copper mineral from a mixture including the arsenic-containing copper mineral and a non-arsenic-containing copper mineral, and a flotation agent used in the same. For a collecting agent, which is a component of the flotation agent used in a flotation step for selectively recovering the arsenic-containing copper mineral from the mixture including the arsenic-containing copper (Continued)

mineral and the non-arsenic-containing copper mineral, a sulfide compound having an $R_1$—S—$R_2$ (in this expression, $R_1$ is a $C_{5-10}$ alkyl group, and $R_2$ is a $C_{1-10}$ alkyl group) structure such as methyl n-octyl sulfide or di-n-octyl sulfide is used.

6 Claims, 7 Drawing Sheets

(56) References Cited

U.S. PATENT DOCUMENTS

| | | | | |
|---|---|---|---|---|
| 2018/0161783 | A1* | 6/2018 | Liu | B03D 1/02 |
| 2019/0345201 | A1* | 11/2019 | Yamashita | B03D 1/016 |
| 2022/0315935 | A1* | 10/2022 | Greene | C22B 11/04 |

FOREIGN PATENT DOCUMENTS

| | | | |
|---|---|---|---|
| JP | 2013-209719 | A | 10/2013 |
| JP | 2020-104095 | A | 7/2020 |
| JP | 2021-074640 | A | 5/2021 |
| WO | 1986/006983 | A1 | 12/1986 |

OTHER PUBLICATIONS

International Search Report (with partial translation) issued Sep. 28, 2021, issued in corresponding International Patent Application No. PCT/JP2021/026559.

* cited by examiner

METHOD FOR SELECTIVELY RECOVERING ARSENIC- CONTAINING COPPER MINERAL, AND FLOTATION AGENT USED IN SAME

TECHNICAL FIELD

The present invention relates to a method for selectively recovering arsenic-containing copper minerals from a mixture containing arsenic-containing copper minerals and arsenic-free copper minerals, and a flotation reagent used therefor.

BACKGROUND ART

In Japan, copper concentrate is imported from foreign countries such as so-called mining countries (for example, South American countries such as Chile and Peru), and smelted domestically to produce copper metal. Copper ore mined abroad generally contains arsenic-containing copper minerals (for example, enargite) and arsenic-free copper minerals (for example, chalcopyrite, bornite, covellite and chalcocite). In recent years, the content of arsenic in copper concentrate tends to increase.

Arsenic contained in copper concentrate is distributed into slag, flue dust, and the like during smelting, fixed in a stable form in a smelter to be processed, which causes concerns of cost increase for processing required due to the content increase, storage locations inside and outside the smelter, and the like. Accordingly, there is a demand for a technique for selectively recovering arsenic-containing copper minerals in ore beneficiation as the pre-stage of copper smelting.

In Non Patent Document 1, the following are described. Owing to difficulty in separation of copper sulfide minerals and arsenic-containing copper minerals, which have similar floatability properties, in the conventional flotation, sodium sulfite was used as depressant and potassium amyl xanthate (PAX) was used as collector. Four types of minerals including chalcopyrite and bornite as copper sulfide minerals, and enargite and tennantite as arsenic-containing copper minerals were used as targets for examination of the influence of each reagent on the recovery.

PRIOR ART DOCUMENTS

Non Patent Document

Non Patent Document 1: Orii, Y. et al., "Study of selective flotation of arsenic containing copper minerals with addition of sodium sulfite", Proceedings of Mining and Materials, Vol. 6 (2019), No. 2 (Proceedings of the 2019 Fall Meeting, MMIJ)

SUMMARY OF INVENTION

Technical Problem

However, as a result of diligent studies by the present inventors, it has been found that the flotation separation method described in Non Patent Document 1 has room for further improvement in separation efficiency between arsenic-containing copper minerals and arsenic-free copper minerals and the like.

An object of the present invention is to provide a method for selectively recovering arsenic-containing copper minerals from a mixture containing arsenic-containing copper minerals and arsenic-free copper minerals in order to reduce arsenic as a harmful substance in copper concentrate, and a flotation reagent used for the method.

Solution to Problem

The present inventors have found that a sulfide compound having a structure $R_1$—S—$R_2$, wherein $R_1$ is an alkyl group having 5 to 10 carbon atoms and $R_2$ is an alkyl group having 1 to 10 carbon atoms, such as methyl n-octyl sulfide and di-n-octyl sulfide is excellent in separation efficiency and the like as collector which is a component of the flotation reagent for use in flotation to selectively recover arsenic-containing copper minerals from a mixture containing arsenic-containing copper minerals and arsenic-free copper minerals.

In other words, the gist of the present invention is as follows:

[1] A method for selectively recovering arsenic-containing copper minerals from a mixture containing arsenic-containing copper minerals and arsenic-free copper minerals, comprising:

a slurrying step of adding water to the mixture to form a slurry; and a flotation step of adding a flotation reagent containing a collector to the slurry to selectively float the arsenic-containing copper minerals for ore beneficiation, the collector being represented by the following formula (1):

$$R_1—S—R_2 \qquad (1)$$

wherein $R_1$ is an alkyl group having 5 to 10 carbon atoms, and $R_2$ is an alkyl group having 1 to 10 carbon atoms.

[2] The recovery method according to item [1], wherein $R_1$ of the collector is a linear alkyl group.

[3] The recovery method according to item [1] or [2], wherein $R_2$ of the collector is an alkyl group having 1 or 2 carbon atoms.

[4] The recovery method according to any one of items [1] to [3], further comprising a pH adjustment step of adjusting the pH of the slurry between the slurrying step and the flotation step.

[5] The recovery method according to any one of items [1] to [4], wherein the arsenic-containing copper minerals contain enargite.

[6] The recovery method according to any one of items [1] to [5], wherein the arsenic-free copper minerals contain any one of chalcopyrite, bornite, covellite, and chalcocite, or a combination thereof.

[7] A flotation reagent used in a method for selectively recovering arsenic-containing copper minerals from a mixture containing arsenic-containing copper minerals and arsenic-free copper minerals comprising a collector represented by the following formula (1):

$$R_1—S—R_2 \qquad (1)$$

wherein $R_1$ is an alkyl group having 5 to 10 carbon atoms, and $R_2$ is an alkyl group having 1 to 10 carbon atoms.

Advantageous Effects of Invention

According to the present invention, a method for selectively recovering arsenic-containing copper minerals from a mixture containing arsenic-containing copper minerals and arsenic-free copper minerals, and a flotation reagent used for the method may be provided. As a result, arsenic content in the copper concentrate to be supplied to copper smelting may be reduced.

DESCRIPTION OF EMBODIMENTS

A preferred embodiment of the present invention is described as follows. Since the following embodiment is an example for illustrating the present invention, the present invention is not limited thereto.

The recovery method of the present embodiment is a method of selectively recovering arsenic-containing copper minerals from a mixture containing arsenic-containing copper minerals and arsenic-free copper minerals.

Figure 1:
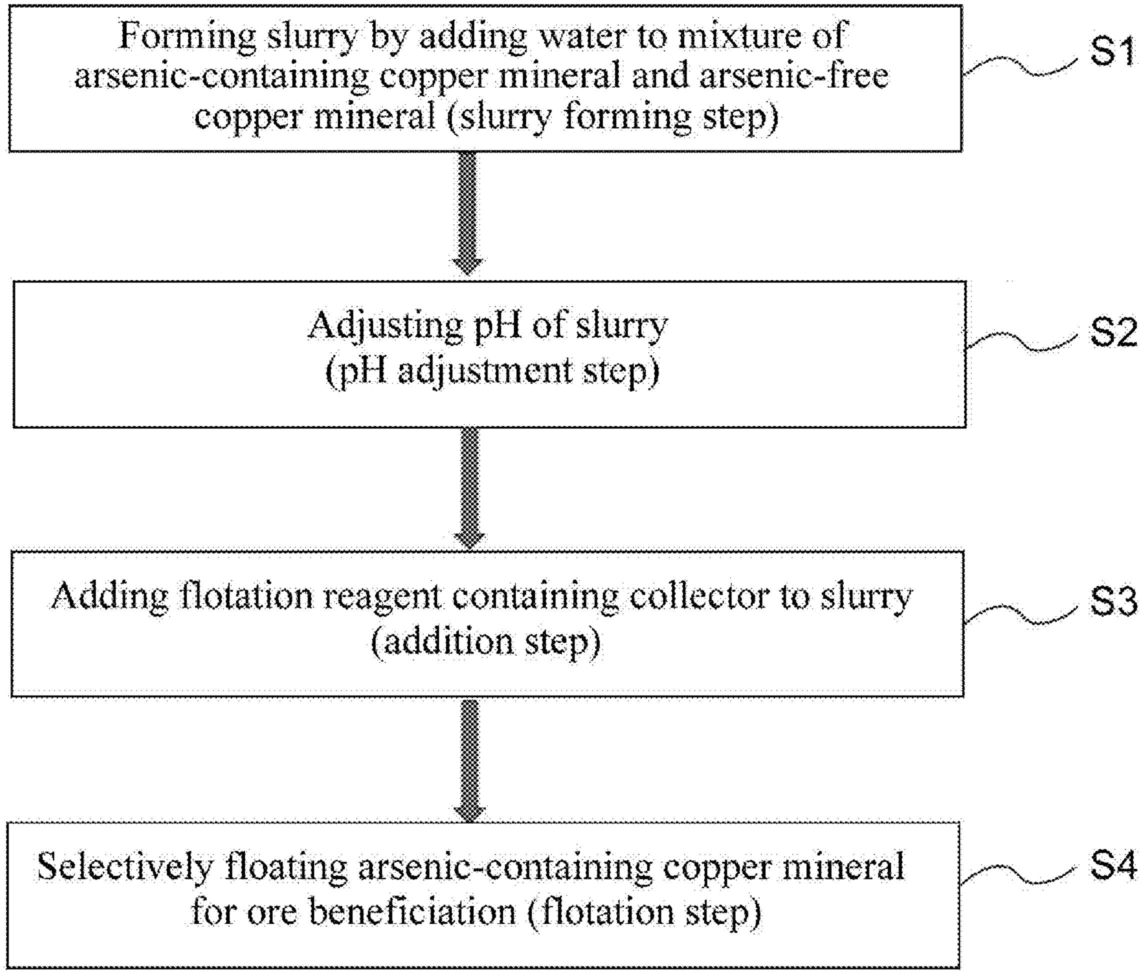
FIG. 1 is a flow chart showing an example of steps in the recovering method in the present embodiment.

An example of the steps of the recovery method of the present embodiment is shown in FIG. 1 as a flow chart. As shown in FIG. 1, the recovery method of the present embodiment includes a step of forming a slurry by adding water to the mixture of arsenic-containing copper minerals and arsenic-free copper minerals (slurry forming step: S1), a step of adjusting the pH of the slurry (pH adjustment step: S2), a step of adding a flotation reagent containing a collector to the slurry (addition step: S3), and a step of selectively floating the arsenic-containing copper minerals for ore beneficiation (flotation step: S4).

In the slurry forming step S1 of the recovery method of the present embodiment, water is added to a mixture containing arsenic-containing copper minerals and arsenic-free copper minerals to form a slurry.

The arsenic-containing copper minerals are copper minerals that contain arsenic. More specifically, the arsenic-containing copper minerals refer to copper minerals containing an arsenic (As) element as chemical composition, and examples thereof include enargite ($Cu_3AsS_4$), tennantite ($Cu_6[Cu_4(Fe, Zn)_2]As_4S_{13}$), giraudite ($Cu_6[Cu_4(Fe, Zn)_2]As_4Se_{13}$), goldfieldite ($Cu_6Cu_4Te_2(Sb, As)_4S_{13}$), and silver tennantite ($Ag_6[Cu_4(Fe, Zn)_2]As_4S_{13}$).

The arsenic-free copper minerals are copper minerals that contain no arsenic. More specifically, the arsenic-free copper minerals are copper minerals that contain no arsenic element as chemical composition. Examples thereof include chalcopyrite ($CuFeS_2$), bornite ($CusFeS_4$), covellite (CuS) and chalcocite ($Cu_2S$).

The arsenic-containing copper minerals may contain locked particles with the arsenic-free copper minerals. Further, the arsenic-free copper minerals may contain a small amount (for example, 0.1 wt % or less) of locked particles with the arsenic-containing copper minerals. Further, the arsenic-free copper minerals may contain a trace amount (for example, 0.1 wt % or less) of arsenic as an impurity.

The mixture containing arsenic-containing copper minerals and arsenic-free copper minerals may be one including arsenic-containing copper minerals and arsenic-free copper minerals. For example, the mixture may be a mixture of milled fine particles of arsenic-containing copper minerals and fine particles of arsenic-free copper mineral. Alternatively, the mixture may be a copper concentrate containing arsenic-containing copper minerals and arsenic-free copper minerals, or a copper ore containing arsenic-containing copper minerals and arsenic-free copper minerals.

The mixing ratio of arsenic-containing copper minerals and arsenic-free copper minerals in the mixture of arsenic-containing copper minerals and arsenic-free copper minerals is not particularly limited as long as arsenic-containing copper minerals are selectively recovered. For example, arsenic-containing copper minerals and arsenic-free copper minerals may be mixed in the same proportions, or the amount of arsenic-containing copper minerals mixed may be larger than the amount of arsenic-free copper minerals, and vice versa.

In the present embodiment, slurry means a fluid in which mineral particles (arsenic-containing copper mineral particles and arsenic-free copper mineral particles) are suspended in an aqueous solution. The water added to the mixture containing arsenic-containing copper minerals and arsenic-free copper minerals is not particularly limited, and may be, for example, distilled water, tap water, or natural water. Alternatively, the water may be tap water, natural water, or the like filtered with an ultrafine reverse osmosis membrane filter called an RO membrane (RO water). The amount of water added to the mixture containing arsenic-containing copper minerals and arsenic-free copper minerals is not particularly limited as long as slurry is formed, and may be, for example, 2 mL to 500 mL relative to 1 g of the mixture containing arsenic-containing copper minerals and arsenic-free copper minerals.

In the recovery method of the present embodiment, the pH of the slurry formed in the slurry forming step S1 is adjusted (pH adjustment step S2).

In the pH adjustment step S2, the pH of the slurry to be adjusted is preferably more than 5, may be pH 6 or more, and more preferably pH 7 or more. The arsenic-containing copper minerals used in the present embodiment tend to easily float in the slurry in an alkaline region, and particularly in the weak alkaline region having pH 8 or more, the chemical adsorption is improved and the arsenic-containing copper minerals tend to easily float.

The temperature of the slurry is not particularly limited as long as arsenic-containing copper minerals can be floated at the temperature, and may be, for example, a normal temperature of 20 to 25° C.

In the recovery method of the present embodiment, a flotation reagent containing a collector is added to the slurry adjusted in the pH adjustment step S2 (addition step S3).

The flotation reagent used in the addition step S3 is not particularly limited as long as it contains a collector represented by the following formula (1):

$$R_1—S—R_2 \quad (1)$$

wherein $R_1$ is an alkyl group having 5 to 10 carbon atoms, and $R_2$ is an alkyl group having 1 to 10 carbon atoms.

$R_1$ of the collector may be a linear alkyl group. Owing to being a linear alkyl group, $R_1$ improves hydrophobicity, so that arsenic-containing copper minerals tend to be more easily floated. $R_1$ may be a linear alkyl group having 7 to 9 carbon atoms.

$R_1$ and $R_2$ of the collector may be alkyl groups having the same structure. Owing to alkyl groups $R_1$ and $R_2$ having the same structure, for example, di-n-octyl sulfide tends to improve the separation efficiency of arsenic-containing copper minerals and arsenic-free copper minerals.

$R_2$ of the collector may be an alkyl group having 1 or 2 carbon atoms. Owing to alkyl group $R_2$ having 1 or 2 carbon atoms, for example, methyl n-octyl sulfide tends to improve the separation efficiency of arsenic-containing copper minerals and arsenic-free copper minerals.

Examples of the collector represented by the formula (1) include methyl n-octyl sulfide, di-n-octyl sulfide, methyl n-amyl sulfide, di-n-amyl sulfide, di-n-hexyl sulfide, methyl n-heptyl sulfide, di-n-heptyl sulfide, di-n-nonyl sulfide, di-n-decyl sulfide, and methyl n-decyl sulfide. Among these, methyl n-octyl sulfide and di-n-octyl sulfide are preferred and methyl n-octyl sulfide is particularly preferred, from the viewpoint of separation efficiency and arsenic (As) grade in sink.

The unique idea and embodiment of the sulfide compound represented by formula (1) for use as collector by the present inventors are based on the following. First, the fact that the S atom of the sulfide compound has high affinity for Cu (I) and As (III) has attracted attention. Next, it has been presumed that having three monovalent Cu (I) even though its arsenic is pentavalent As (V), enargite as a representative example of arsenic-containing copper minerals has high affinity for the S atom of the sulfide compound. Furthermore, based on an idea that due to having an S group with high hydrophobicity similar to an alkyl group, the sulfide compound may easily cause adsorption to enargite particles containing S atoms resulting from hydrophobic interaction, the sulfide compound represented by the formula (1) has been selected for the embodiment.

The amount of the collector added may be 50 g to 2000 g, 60 g to 1500 g, or 70 g to 1300 g per 1 ton of the mixture containing arsenic-containing copper minerals and arsenic-free copper minerals. With an amount of the collector added of less than 50 g per 1 ton of the mixture, the recovery of the arsenic-containing copper minerals tends to be low, while with an amount of more than 2000 g, the recovery is not improved much, and the selectivity rather tends to decrease. The amount of the collector added may be 0.25 to 4 times the upper limit of the solubility of the collector in the solution (water). The addition amount is based on copper concentrate, and in the case of copper ore, the proportions of arsenic-containing copper minerals and arsenic-free copper minerals contained are low, so that the addition amount may be appropriately adjusted depending on the ratios.

The flotation reagent may contain a depressant, a frother, and the like in addition to the collector. Alternatively, the flotation reagent may be the collector itself without particularly containing any other reagent.

As described above, the flotation reagent of the present embodiment is used in a method for selectively recovering arsenic-containing copper minerals from a mixture containing arsenic-containing copper minerals and arsenic-free copper minerals, and contains a collector represented by the following formula (1):

$$R_1—S—R_2 \quad (1)$$

wherein $R_1$ is an alkyl group having 5 to 10 carbon atoms, and $R_2$ is an alkyl group having 1 to 10 carbon atoms.

In the recovery method of the present embodiment, arsenic-containing copper minerals in the slurry including the collector-containing flotation reagent added in the addition step S3 are selectively floated for ore beneficiation (flotation step S4).

In the present embodiment, selectively recovering arsenic-containing copper minerals means that arsenic-containing copper minerals are floated to the surface side in the slurry solution for ore beneficiation in the flotation step, which includes selectively separating arsenic-containing copper minerals and arsenic-free copper minerals. The float (froth) contains arsenic-containing copper minerals. The float may contain not only arsenic-containing copper minerals but also arsenic-free copper minerals, other minerals, impurities and the like. In the present embodiment, selectively recovering arsenic-containing copper minerals also means efficiently removing arsenic-containing copper minerals from a mixture of arsenic-containing copper minerals and arsenic-free copper minerals. Alternatively, in an extracting step as post-process, arsenic may be removed from the selectively recovered arsenic-containing copper minerals to obtain copper.

In the recovery method of the present embodiment in which arsenic-containing copper minerals are floated for ore beneficiation, the arsenic-free copper mineral may sink on the bottom in the slurry solution so as to be recovered. In other words, by the so-called reverse flotation process, a concentrate with a low arsenic content containing arsenic-free copper minerals may be efficiently obtained from a mixture of arsenic-containing copper minerals and arsenic-free copper minerals.

Flotation is a separation method using the following phenomenon. By blowing air into a slurry in which mineral particles are suspended in water, hydrophobic particles among the mineral particles adhere to the bubbles and float, while hydrophilic particles among the mineral particles are unable to adhere to air bubbles and stay in the slurry. The collector includes a site that selectively adsorbs target mineral particles and a hydrophobic group that easily adheres to bubbles. In the present embodiment, a method of increasing the concentration of required mineral particles in a slurry by adhering bubbles to unrequired mineral particles to be floated for separation is called reverse flotation. The collector of the present embodiment has a hydrophobic group and a site that selectively adsorbs arsenic-containing minerals without adsorbing arsenic-free copper minerals, so that only arsenic-containing copper minerals (particles) can adsorb bubbles to be selectively floated to the upper surface of the slurry. As a result, a float (froth) of high-arsenic copper concentrate in which arsenic is concentrated is formed. Further, efficient separation may be achieved by performing a reverse flotation to increase the concentration of arsenic-free copper minerals (particles) in the slurry. As a result, arsenic-free copper minerals are concentrated in sink (tailing), which forms a low-arsenic copper concentrate with lowered content of arsenic. In other words, the recovery method of the present embodiment is a method of selectively recovering arsenic-containing copper minerals from a mixture containing arsenic-containing copper minerals and arsenic-free copper minerals, including a slurrying step of forming a slurry by adding water to the mixture, and a reverse flotation step of adding a flotation reagent containing a collector to the slurry to selectively float the arsenic-containing copper minerals for ore beneficiation and to concentrate the arsenic-free copper minerals in the slurry.

In the present embodiment, the recovery and the separation efficiency may be determined as follows. In some formulas, the case where the arsenic-containing copper mineral is enargite is described as an example.

Further, the recovery method of the present embodiment for copper ore may be also used for differential flotation of arsenic-containing copper ore in which arsenic-containing copper ore is selectively floated in a slurry directly from copper ore to recover high-arsenic grade copper concentrate.

In flotation, arsenic-containing copper minerals and arsenic-free copper minerals which are present as free particles enable more effective ore beneficiation. It is therefore desirable to perform a pretreatment such as grinding, such that most of the arsenic-containing copper minerals and the arsenic-free copper minerals are liberated. The average particle size of the mixture of the finely milled arsenic-containing copper minerals and arsenic-free copper minerals is preferably 10 μm or more. As a result, the mineral particles tend to be easily adsorbed on the bubbles.

[Numerical Formula 1]

$$\text{Recovery of arsenic-containing copper mineral [\%]} = \text{Recovery of copper derived from arsenic-containing copper mineral [\%]} = \frac{\text{Weight of copper derived from arsenic-containing copper mineral in float [g]}}{\text{Weight of copper derived from arsenic-containing copper mineral in feed [g]}} \times 100$$

[Numerical Formula 2]

$$\text{Weight of copper derived from arsenic-containing copper mineral [g]} = \text{Arsenic content [g]} \times \text{Theoretical Cu/As ratio in enargite [-]}$$

[Numerical Formula 3]

$$\text{Recovery of arsenic-free copper mineral [\%]} = \text{Recovery of copper derived from arsenic-free copper mineral [\%]} = \frac{\text{Weight of copper in float [g]} - \text{Weight of copper derived from arsenic-containing copper mineral in float [g]}}{\text{Weight of copper in feed [g]} - \text{Weight of copper derived from arsenic-containing copper mineral in feed [g]}} \times 100$$

[Numerical Formula 4]

$$\text{Separation efficiency} = \text{Recovery of arsenic-contaning copper mineral [\%]} - \text{Recovery of arsenic-free copper mineral [\%]}$$

In the present embodiment, it is preferable that the recovery and separation efficiency of arsenic-containing copper minerals be high. Further, with a high recovery of arsenic-containing copper minerals, the arsenic-free copper minerals (particles) in the slurry are concentrated, and the sink of low-arsenic copper concentrate with lower arsenic content is formed, which is also preferable.

The copper-containing minerals as target of the present embodiment is not limited to a mineral specimen, and may be a copper ore.

A recovery method of the present embodiment for copper ore includes initially recovering copper concentrate containing a large amount of impurities by a conventional general flotation ore beneficiation method, and subsequently separating arsenic-containing copper minerals and arsenic-free copper minerals according to the step provided in the recovery method of the present embodiment, so that high-arsenic grade copper concentrate and low-arsenic grade copper concentrate can be recovered. It is noted that, in the case of using copper concentrate, a reagent used for recovering the copper concentrate containing a large amount of impurities may adhere to the surface of the copper concentrate. Accordingly, it is preferable that the surface of the copper concentrate be washed, for example, with acetone as pretreatment, and/or it is preferable that the surface covered with the reagent or the like be peeled off by a physical treatment such as ore re-grinding. By such pretreatment and peeling treatment, the separation efficiency of arsenic-containing copper minerals and arsenic-free copper minerals in flotation tends to be improved. In other words, the present invention may also be applied when arsenic-containing copper minerals and arsenic-free copper minerals are separated from the arsenic-containing copper concentrate to recover high-arsenic grade copper concentrate and low-arsenic grade copper concentrate. In this case, the copper grade of copper concentrate containing impurities as intermediate raw material at a high concentration is not particularly limited.

As described above, according to the recovery method of the present embodiment, arsenic-containing copper minerals may be efficiently and selectively recovered from a mixture containing arsenic-containing copper minerals and arsenic-free copper minerals. Further, according to the present embodiment, a flotation reagent containing an excellent collector used in the method is also provided. As a result, arsenic content in the copper concentrate used in the copper smelting may be efficiently reduced.

EXAMPLES

Hereinafter, the advantageous effect of the present invention is described in more detail with reference to Examples. The present invention is not limited thereto.

[Procedure 1: Preparation of Test Sample]

Arsenic-free copper minerals and arsenic-containing copper minerals were used as mineral specimens for examination. Specifically, as the arsenic-containing copper mineral specimen x, having a mineral specimen name of enargite, was set, and as the arsenic-free copper minerals, mineral specimens a to d, having mineral specimen names of chalcopyrite, bornite, covellite and chalcocite, were set, respectively. First, the mineral specimens x and a to d were visually selected by hand to remove unnecessary minerals. Then, using a disc mill manufactured by FRITSCHE, each mineral specimen was milled, passed through a 150 μm sieve, and sifted out at 75 μm to make a test sample.

[Procedure 2: Analysis of Test Sample]

As grade analysis of each test sample, the elemental grade was obtained by the following analysis flow.

First, each test sample was subjected to weight measurement, and then subjected to microwave heating and acid dissolution. Through dilution in a measuring flask, the volume was fixed to prepare an analysis sample solution. Each of these analytical sample solutions was subjected to ICP analysis using ICP-OES 5110 manufactured by Agilent Technologies, so that the element concentration in the solution was quantitatively analyzed. Specifically, the volume of the solution after dilution in the measuring flask was multiplied by the concentration of each component element in the solution analyzed by ICP, and divided by the weight of the acid-dissolved sample to obtain the elemental grade (wt %). The results are shown in Table 1.

TABLE 1

| Mineral specimen | Mineral specimen name | As [wt %] | Cu [wt %] | Fe [wt %] |
|---|---|---|---|---|
| x | Enargite | 14.72 | 38.52 | 7.77 |
| a | Chalcopyrite | 0.01 | 16.85 | 18.35 |
| b | Bornite | 0.05 | 67.38 | 6.42 |
| x | Covellite | 0.00 | 51.95 | 9.04 |
| d | Chalcocite | 0.01 | 73.15 | 1.99 |

The mineral content of each test sample was determined through the following flow.

Figure 2:
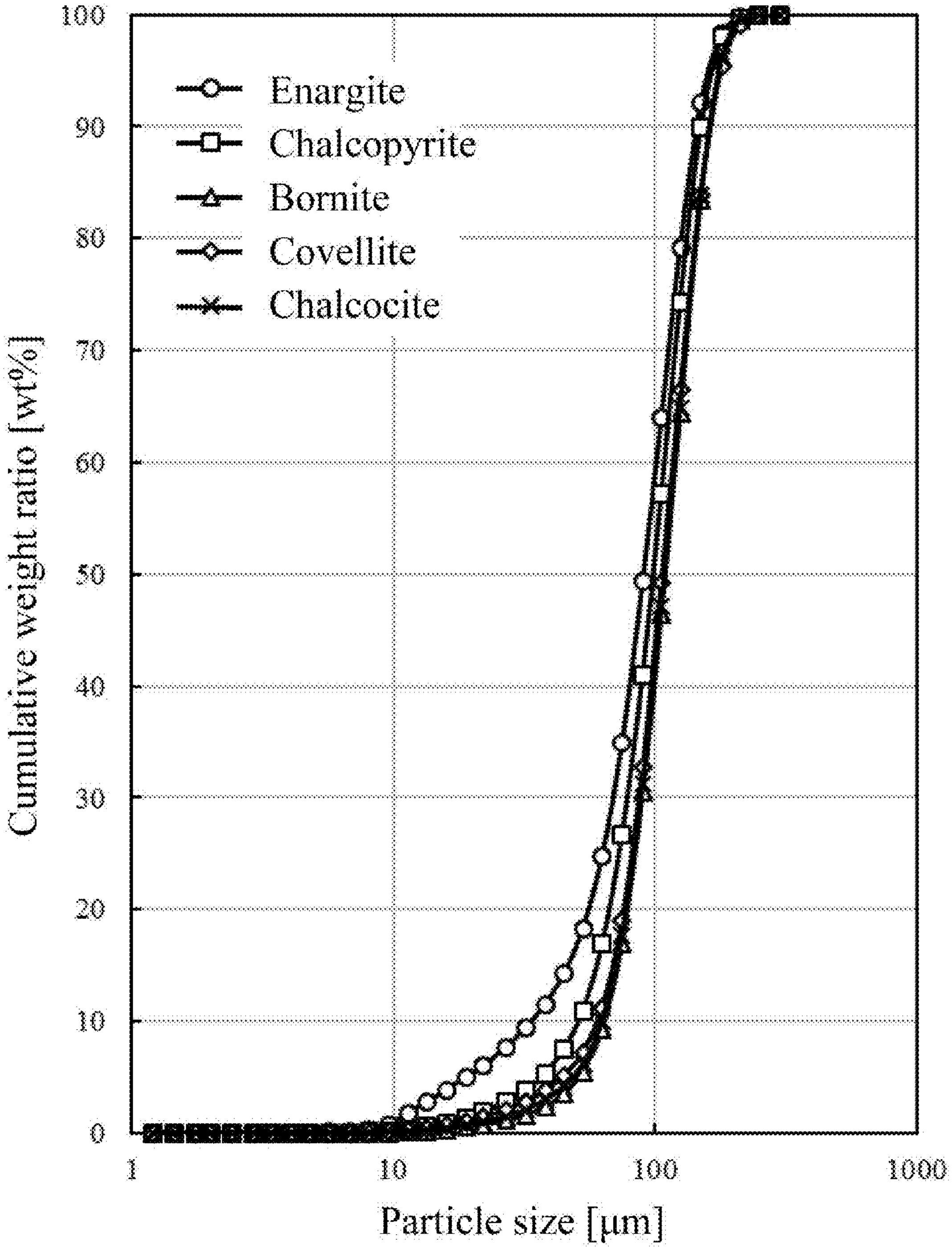
FIG. 2 is a chart showing particle size distributions after classifying to −150+75 μm of various copper mineral specimens (enargite, chalcopyrite, bornite, covellite and chalcocite) used in tests.

First, each test sample was filled with resin, and the surface was polished to make an analysis sample. Each of these analysis samples was subjected to grade analysis and shape analysis using MLA (Quanta650) manufactured by FEI. MLA is an abbreviation for Mineral Liberation Analyzer, which is an automatic mineral analyzer with a mineral analysis software built into SEM-EDS. Using MLA, the mineral content (modal mineralogy) was measured through quantitative analysis, and the particle size distribution was measured through shape analysis. The results are shown in Table 2 and FIG. 2, respectively.

TABLE 2

| Mineral specimen | Mineral Specimen name | Content of mineral identified by MLA [wt %] | | | | | |
|---|---|---|---|---|---|---|---|
| | | Enargite | Tennantite | Chalcopyrite | Bornite | Covellite | Chalcocite |
| x | Enargite | 76.05 | 6.73 | 0.09 | 1.14 | 0.22 | 0 |
| a | Chalcopyrite | 0.01 | 0.01 | 50.38 | 0.01 | 0 | 0 |
| b | Bornite | 0 | 0 | 0 | 38.85 | 17.54 | 43.59 |
| c | Covellite | 0 | 0 | 0 | 0.50 | 47.07 | 36.15 |
| d | Chalcocite | 0 | 0 | 0 | 2.60 | 2.82 | 93.78 |

*About 40 wt % of the mineral specimen a is made of silicate mineral having no large effect on flotation separation of arsenic-free copper minerals and arsenic-containing copper minerals.

[Procedure 3: Preparation of Mixture Sample]

Mixtures were prepared by mixing the mineral specimen x, having a mineral specimen name of enargite, and the various arsenic-free copper minerals, having mineral specimen names of chalcopyrite, bornite, covellite and chalcocite, (mineral specimens a to d, respectively) at a weight ratio of 1:1, respectively for use as mixture samples in the test. Hereinafter, they are referred to as mixture samples A to D, respectively, and are shown in Table 3.

TABLE 3

| Mixture sample | Mineral specimen name and mixing ratio | As [wt %] | Cu [wt %] | Fe [wt %] |
|---|---|---|---|---|
| A | Enargite:Chalcopyrite = 1:1 | 7.36 | 27.68 | 13.06 |
| B | Enargite:Bornite = 1:1 | 7.38 | 52.95 | 7.09 |
| C | Enartgite:Covellite = 1:1 | 7.36 | 45.23 | 8.41 |
| D | Enartgite:Chalcocite = 1:1 | 7.36 | 55.83 | 4.88 |

As the collector, di-n-butyl sulfide, di-n-octyl sulfide, or methyl n-octyl sulfide was used. Further, for comparison, potassium amyl xanthate (PAX), which is a general collector, was used. Each of the collectors was dissolved or dispersed in RO water to prepare a 0.1 wt % collector solution for use in the test.

Example 1

Figure 3:
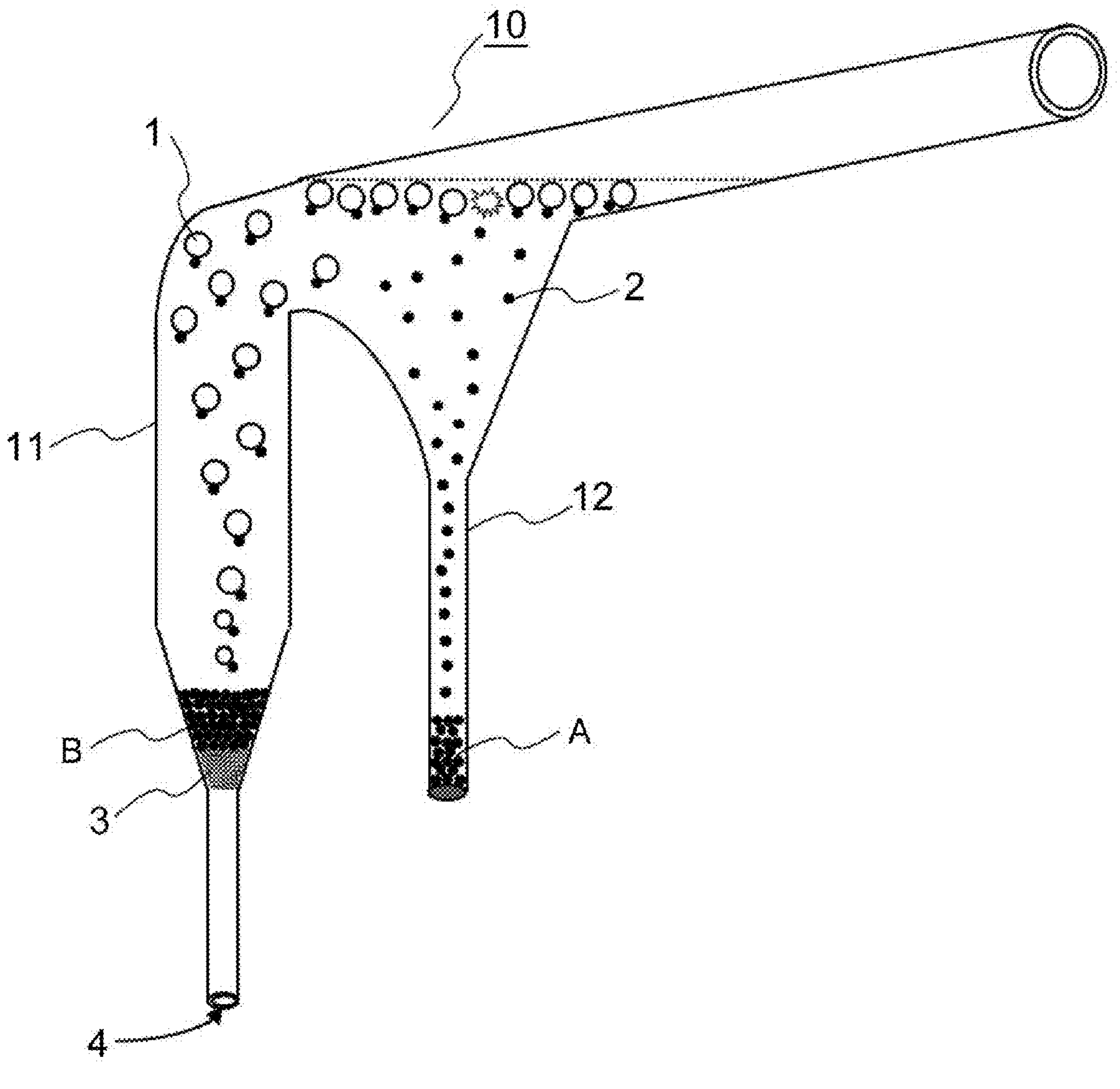
FIG. 3 is a schematic view showing a simple flotation instrument (Hallimond tube) used in Examples.

A separation evaluation test was performed according to the following flow using a known simple flotation tester 10 (Hallimond tube) shown in FIG. 3.

First, 1 g of a predetermined mixture sample and 100 mL of RO water were added to a beaker, and then NaOH in an amount for setting a predetermined pH was added to adjust the pH. Next, a predetermined amount of 0.1 wt % collector solution was added as a flotation reagent and stirred in a beaker for 10 minutes, and then a simple flotation tester 10 was filled with the slurry. Next, air 4 was introduced from below a tube 11, to generate bubbles 1, so that separation was performed by flotation. Specifically, highly hydrophobic particles 2 (arsenic-containing copper mineral particles) adhere to the bubbles to be floated, and the floated bubbles 1 burst on the upper side. The particles 2 settle in a tube 12 connected to the tube 11 and accumulate (float A, froth). On the other hand, most of the low hydrophobic particles (arsenic-free copper mineral particles, not shown in drawing) do not adhere to the bubbles 1 and stay in the original tube 11 (sink B, tailing).

The elemental grade (wt %) of arsenic in the resulting sink B (low arsenic product) was determined according to the same analysis flow as in the procedure 2 using ICP analysis.

Further, the recovery and the separation efficiency were determined according to the procedures described in [Numerical formula 1] to [Numerical formula 4] in the detailed description of the invention.

In Example 1, the separation evaluation test was performed for a case where a mixture sample A (mineral specimen name and mixing ratio, Sulfur sulfide ore:Chalcopyrite=1:1) was used as the mixture sample, the pH was adjusted to 10, and PAX, di-n-methyl sulfide, di-n-octyl sulfide, or methyl n-octyl sulfide was added as collector at a proportion of 100 g to each 1 ton of ore, and a case where no collector was added (blank). The recovery of arsenic-containing copper minerals and arsenic-free copper minerals are shown in Table 4 and FIG. 4. Further, the grades of As of the sink are shown in Table 4.

TABLE 4

| | (1) Recovery of arsenic-containing copper mineral into float [%] | (2) Recovery of arsenic-containing copper mineral into float [%] | (1)-(2) Separation efficiency [%] | Grade of As in sink [wt %] |
|---|---|---|---|---|
| Blank | 44.95 | 13.96 | 30.99 | 4.69 |
| PAX | 51.68 | 10.06 | 41.62 | 4.88 |
| Di-n-butyl | 33.87 | 4.74 | 29.13 | 5.20 |
| Di-octyl sulfide | 61.68 | 11.44 | 50.24 | 4.45 |
| Methyl -octyl sulfide | 88.32 | 23.51 | 64.81 | 1.78 |

Figure 4:
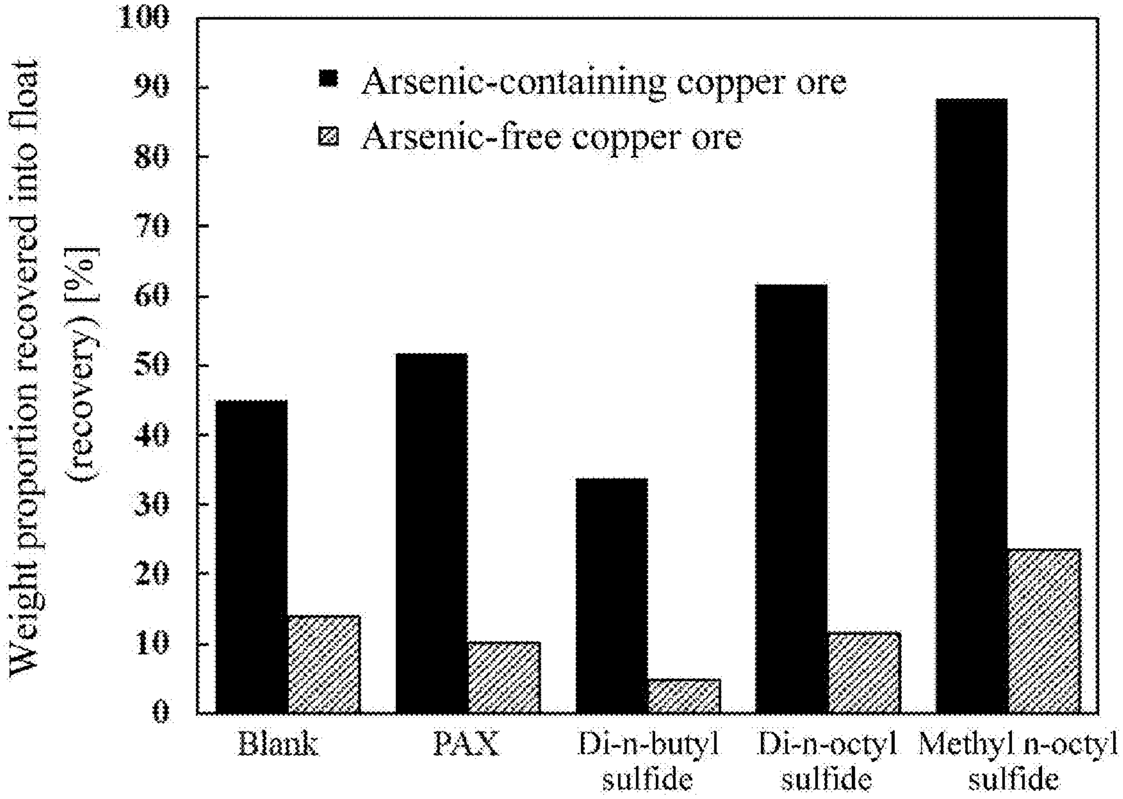
FIG. 4 is a graph showing the respective weight proportions (recovery) of arsenic-containing copper minerals and arsenic-free copper minerals recovered into float in Example 1.

As shown in Table 4 and FIG. 4, for the mixture of enargite and chalcopyrite, by applying di-n-octyl sulfide or methyl n-octyl sulfide, floating of enargite (arsenic-containing copper mineral) was more effectively facilitated in comparison with PAX or the like, so that the separation efficiency was improved and the grade of As in the sink was lowered.

Example 2

In Example 2, the separation evaluation test was performed in the same manner as in Example 1, except that a mixture sample B (mineral specimen name and mixing ratio, Enargite:Bornite=1:1) was used as the mixture sample. The recovery of arsenic-containing copper minerals and arsenic-free copper minerals are shown in Table 5 and FIG. 5. Further, the grades of As of the sink are shown in Table 5.

TABLE 5

| | (1) Recovery of arsenic-containing copper mineral into float [%] | (2) Recovery of arsenic-containing copper mineral into float [%] | (1)-(2) Separation efficiency [%] | Grade of As in sink [wt %] |
|---|---|---|---|---|
| Blank | 23.36 | 4.58 | 18.78 | 5.23 |
| PAX | 31.25 | 3.13 | 28.12 | 5.41 |
| Di-n-butyl sulfide | 13.77 | 4.10 | 9.67 | 6.77 |
| Di-n-octyl sulfide | 41.28 | 7.23 | 34.03 | 5.22 |
| Methyl n-octyl sulfide | 65.70 | 9.75 | 55.95 | 3.53 |

Figure 5:
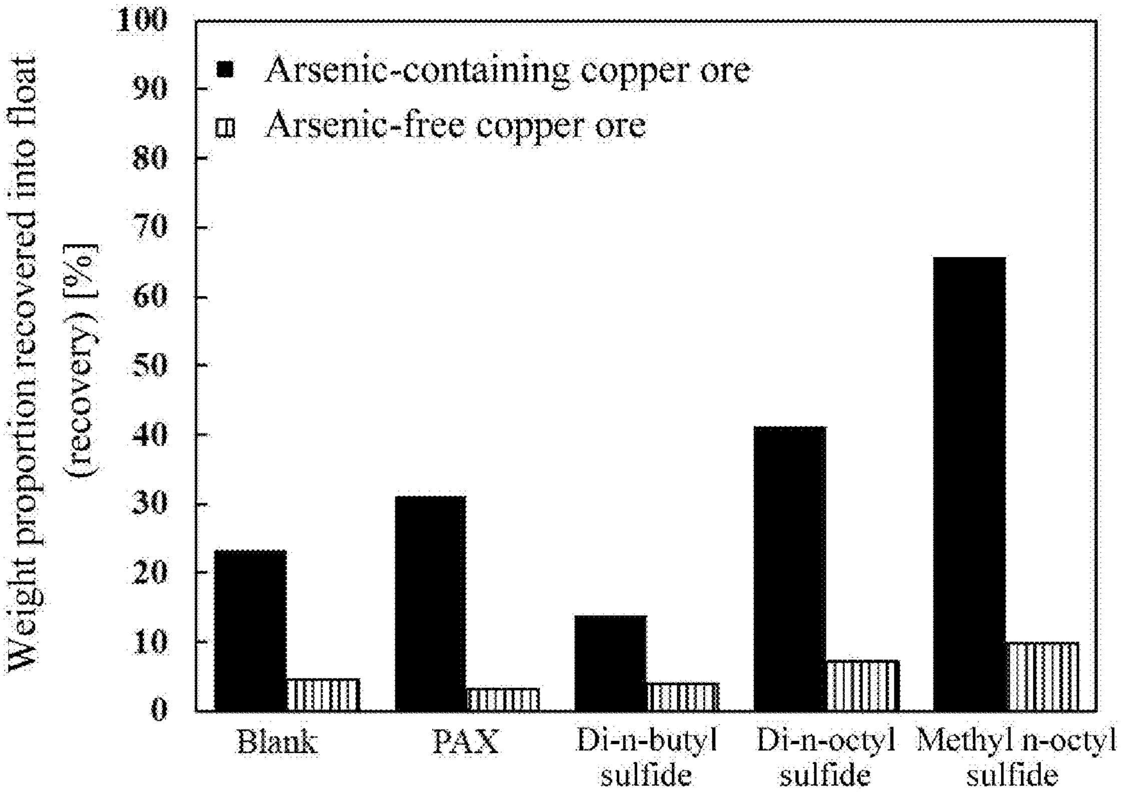
FIG. 5 is a graph showing the respective weight proportions (recovery) of arsenic-containing copper minerals and arsenic-free copper minerals recovered into float in Example 2.

As shown in Table 5 and FIG. 5, for the mixture of enargite and bornite, by applying di-n-octyl sulfide or methyl n-octyl sulfide, floating of enargite (arsenic-containing copper mineral) was more effectively facilitated in comparison with PAX or the like, so that the separation efficiency was improved and the grade of As in the sink was lowered.

Example 3

In Example 3, the separation evaluation test was performed in the same manner as in Example 1, except that a mixture sample C (mineral specimen name and mixing ratio, Enargite:Covellite=1:1) was used as the mixture sample. The recovery of arsenic-containing copper minerals and arsenic-free copper minerals are shown in Table 6 and FIG. 6. Further, the grades of As of the sink are shown in Table 6.

TABLE 6

| | (1) Recovery of arsenic-containing copper mineral into float [%] | (2) Recovery of arsenic-containing copper mineral into float [%] | (1)-(2) Separation efficiency [%] | Grade of As in sink [wt %] |
|---|---|---|---|---|
| Blank | 30.71 | 2.14 | 28.57 | 5.43 |
| PAX | 58.83 | 17.26 | 41.57 | 4.39 |
| Di-n-butyl sulfide | 33.03 | 12.81 | 20.22 | 602 |
| Di-n-octyl sulfide | 69.89 | 7.94 | 61.96 | 3.33 |
| Methyl n-octyl sulfide | 86.03 | 5.71 | 80.32 | 1.78 |

Figure 6:
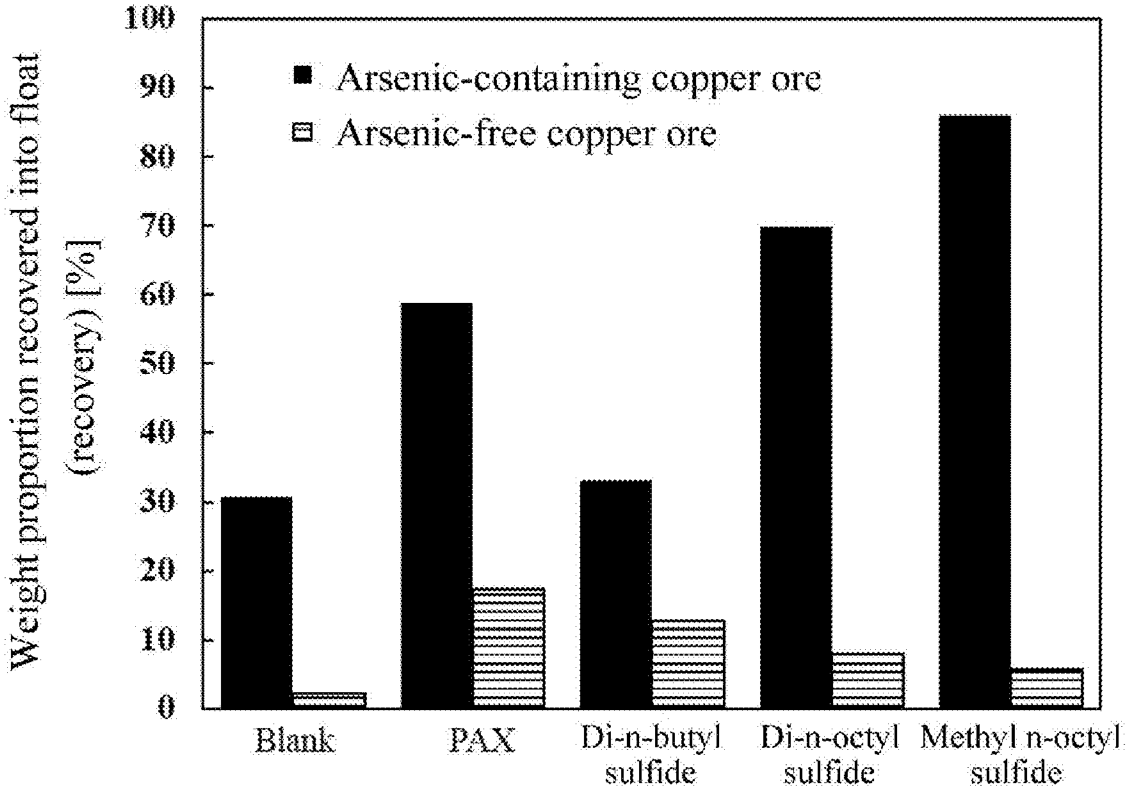
FIG. 6 is a graph showing the respective weight proportions (recovery) of arsenic-containing copper minerals and arsenic-free copper minerals recovered into float in Example 3.

As shown in Table 6 and FIG. 6, for the mixture of enargite and covellite, by applying di-n-octyl sulfide or methyl n-octyl sulfide, floating of enargite (arsenic-containing copper mineral) was more effectively facilitated in comparison with PAX or the like, so that the separation efficiency was improved and the grade of As in the sink was lowered.

Example 4

In Example 4, the separation evaluation test was performed in the same manner as in Example 1, except that a mixture sample D (mineral specimen name and mixing ratio, Enargite:Chalcocite=1:1) was used as the mixture sample. The recovery of arsenic-containing copper minerals and arsenic-free copper minerals are shown in Table 7 and FIG. 7. Further, the grades of As of the sink are shown in Table 7.

TABLE 7

| | (1) Recovery of arsenic-containing copper mineral into float [%] | (2) Recovery of arsenic-containing copper mineral into float [%] | (1)-(2) Separation efficiency [%] | Grade of As in sink [wt %] |
|---|---|---|---|---|
| Blank | 8.95 | 0.41 | 8.54 | 5.08 |
| PAX | 42.26 | 2.52 | 39.74 | 5.06 |
| Di-n-butyl sulfide | 21.32 | 6.34 | 14.98 | 6.31 |
| Di-n-octyl sulfide | 68.96 | 1.90 | 67.06 | 1.48 |
| Methyl n-octyl sulfide | 86.82 | 8.00 | 78.82 | 1.53 |

Figure 7:
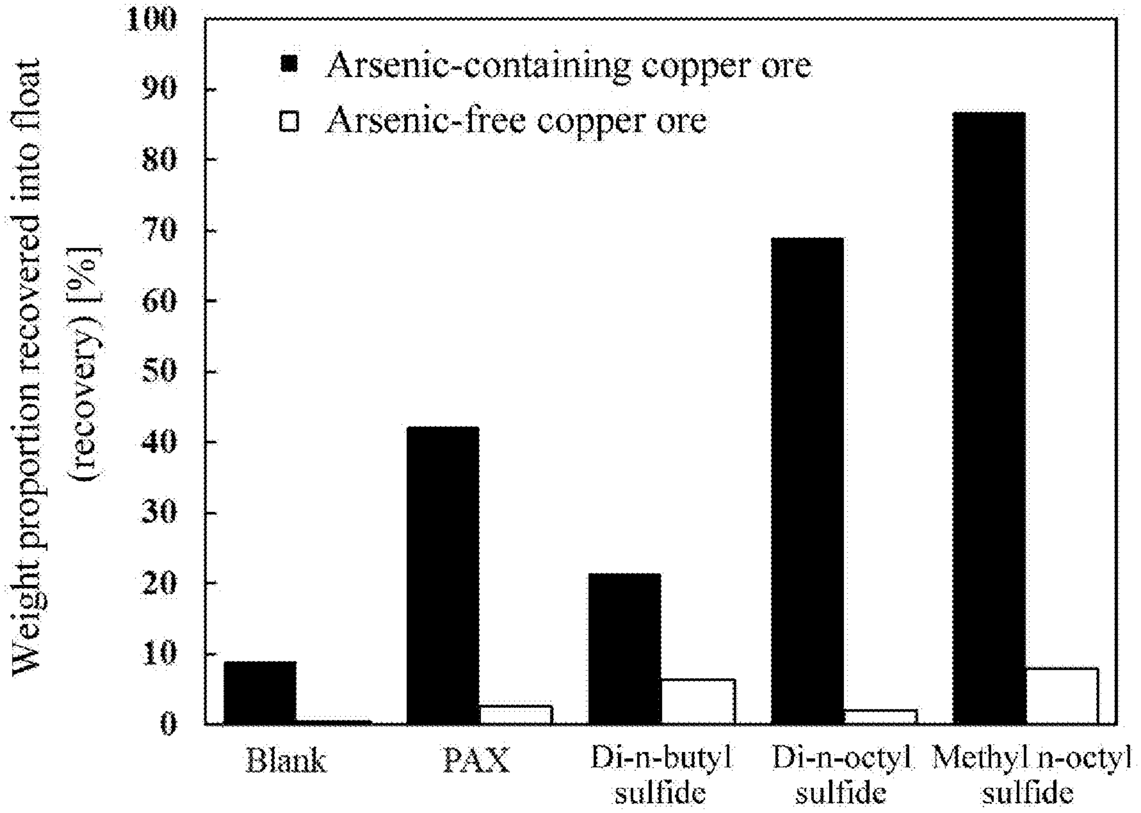
FIG. 7 is a graph showing the respective weight proportions (recovery) of arsenic-containing copper minerals and arsenic-free copper minerals recovered into float in Example 4.

As shown in Table 7 and FIG. 7, for the mixture of enargite and Chalcocite, by applying di-n-octyl sulfide or methyl n-octyl sulfide, floating of enargite (arsenic-containing copper mineral) was more effectively facilitated in comparison with PAX or the like, so that the separation efficiency was improved and the grade of As in the sink was lowered.

Example 5

A copper concentrate (a product that passed through a sieve with a mesh opening of 75 μm and did not pass through a sieve with a mesh opening of 38 μm) was used as a sample. The copper concentrate was used after washing with acetone for 2 hours using a soxhlet extractor in order to remove the flotation reagent considered to be originally attached.

The elemental grade (wt %) of the copper concentrate used as a sample was determined through the same analysis flow as in Example 1. The results are shown below.

As: 4.16 wt %

Cu: 29.60 wt %

Fe: 17.65 wt %

Further, the mineral composition of the copper concentrate was analyzed using MLA in the same manner as in Example 1 to determine the composition ratios of the main mineral compositions. The results are shown below.

Chalcopyrite: 35.3 wt %

Covellite: 15.0 wt %

Chalcopyrite: 9.7 wt %

Bornite: 13.0 wt %

Enargite 20.1 wt % The separation evaluation test was performed through the following flow using an agitare-type flotation tester.

First, 25 g of a predetermined copper concentrate and 475 mL of RO water were added into a 500-mL cell for an agitare-type flotation tester, and then NaOH in an amount for setting a predetermined pH was added to adjust the pH. Next, 0.1 wt % collector solution in a predetermined amount was added as a flotation reagent, and the mixture was stirred in the cell for 10 minutes. Then, a frother in an amount corresponding to 250 g per 1 ton of ore was added, and the mixture was stirred in the cell for 30 seconds. Then, stirring was continued, air was blown in, and separation was performed by flotation for 8 minutes.

The float and the sink obtained in each flotation time section by the flotation were subjected to the procedure described in [Equation 1] to [Equation 4] of the detailed description of the invention to determine the recovery and the separation efficiency.

Figure 8:
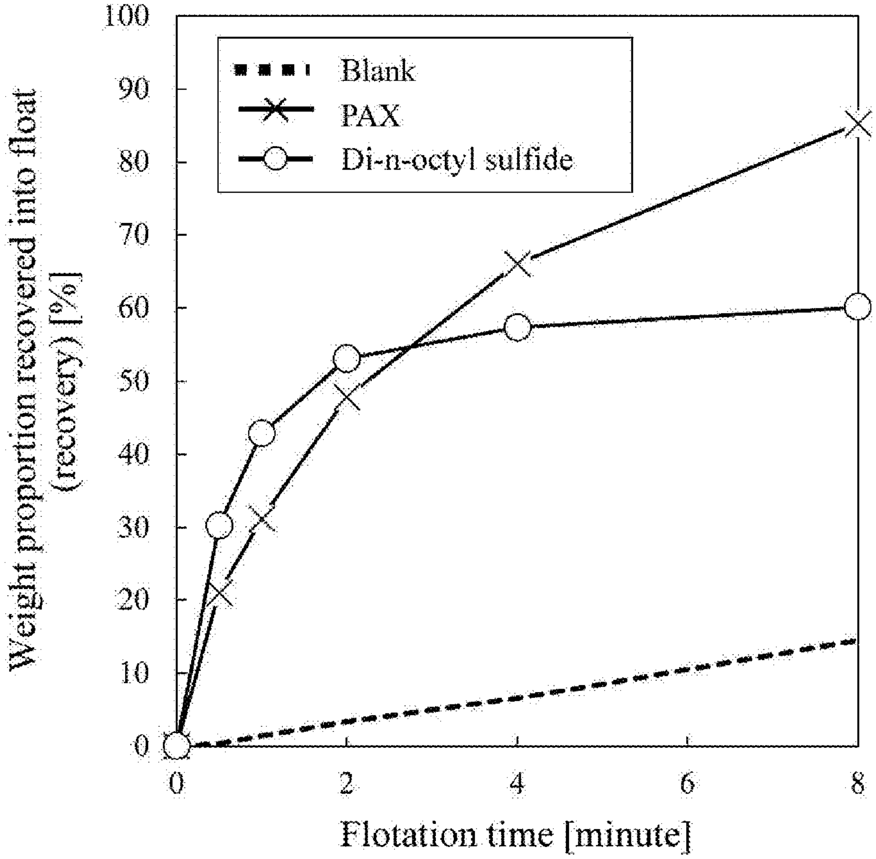
FIG. 8 is a graph showing weight proportion (recovery) of arsenic-containing copper minerals recovered into float, plotted relative to the flotation time (minute) in Example 5.
Figure 9:
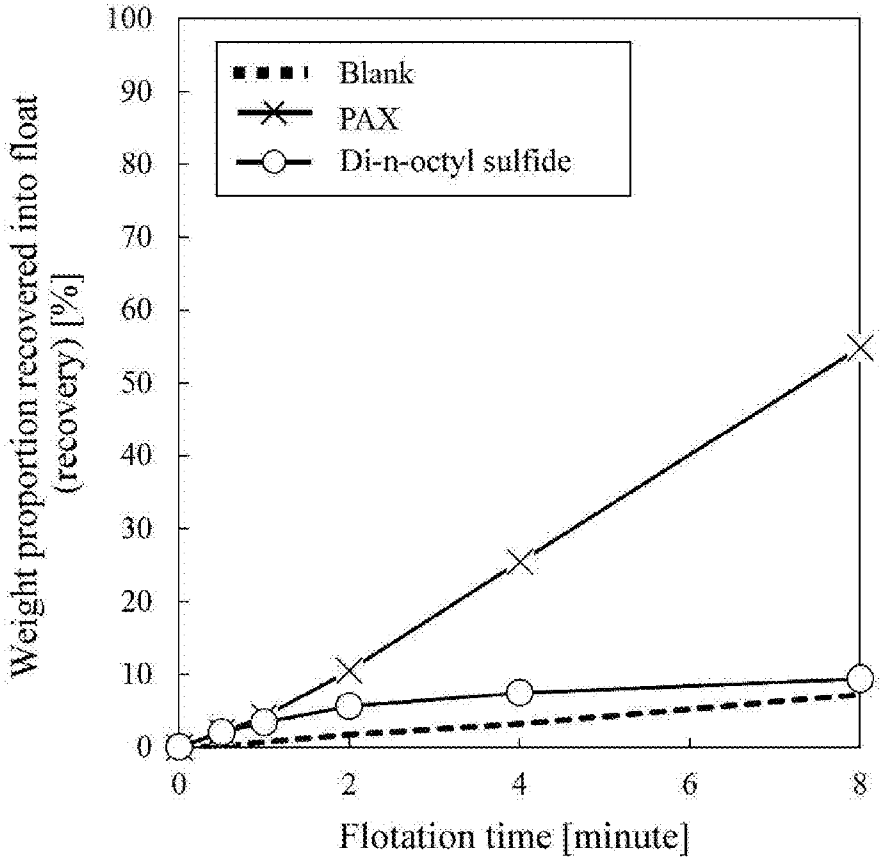
FIG. 9 is a graph showing weight proportion (recovery) of arsenic-free copper minerals recovered into float, plotted relative to the flotation time (minute) in Example 5.

The recovery of arsenic-containing copper minerals and arsenic-free copper minerals are shown in FIGS. 8 and 9, and Table 8, respectively. As shown in FIGS. 8 and 9, and Table 8, by applying di-n-octyl sulfide, the separation efficiency was improved in comparison with PAX.

TABLE 8

| | Flotation time (minute) | Recovery into float [%] (1) Arsenic-Containing copper ore | (2) Arsenic-free copper ore | (1)-(2) Separation efficiency [%] |
|---|---|---|---|---|
| Blank | 0.5 | 0.4 | 0.2 | 0.2 |
| | 1 | 1.4 | 0.7 | 0.7 |
| | 2 | 3.4 | 1.7 | 1.7 |
| | 4 | 6.6 | 3.2 | 3.4 |
| | 8 | 14.5 | 7.2 | 7.3 |
| PAX | 0.5 | 21.0 | 2.1 | 18.9 |
| | 1 | 31.2 | 4.1 | 27.0 |
| | 2 | 47.8 | 10.6 | 37.3 |
| | 4 | 66.0 | 25.4 | 40.6 |
| | 8 | 85.2 | 54.9 | 30.4 |
| Di-n-octyl sulfide | 0.5 | 30.3 | 2.0 | 28.3 |
| | 1 | 42.8 | 3.4 | 39.5 |
| | 2 | 53.1 | 5.6 | 47.5 |
| | 4 | 57.4 | 7.5 | 49.9 |
| | 8 | 60.1 | 9.4 | 50.7 |

(pH Test)

Under the same conditions as in Example 1, di-n-octyl sulfide or methyl n-octyl sulfide in an addition amount of 100 g per 1 ton of the mixture containing arsenic-containing copper mineral and arsenic-free copper mineral was used as collector, and in alkaline regions of pH 7, pH 8, pH 9, and pH 10, the separation efficiencies between enargite and chalcopyrite, enargite and bornite, enargite and covellite, and enargite and chalcocite, and the grade of sink were measured. As a result, in the alkaline region of pH 7 to 10, it was confirmed that the higher the pH, the higher the separation efficiency and the lower the grade of arsenic in the sink.

(Test of Addition Amount)

Under the same conditions as in Example 1, di-n-octyl sulfide in an addition amount of 100 g or 1000 g per 1 ton of the mixture containing arsenic-containing copper minerals and arsenic-free copper minerals was used as collector, and, in an alkaline region of pH 10, the separation efficiencies between enargite and chalcopyrite, enargite and bornite, enargite and covellite, and enargite and chalcocite, and the grade of sink were measured. As a result, it was confirmed that the separation efficiency was improved and the grade of arsenic in the sink was reduced as the amount of the collector added was increased.

INDUSTRIAL APPLICABILITY

The present invention provides a method for selectively recovering arsenic-containing copper minerals from a mixture containing arsenic-containing copper minerals and arsenic-free copper minerals and a novel flotation reagent used for the method. As a result, arsenic in copper concentrate to be supplied to a copper smelting step can be reduced, so that the present invention has industrial applicability.

The invention claimed is:

1. A method for selectively recovering arsenic-containing copper minerals from a mixture containing arsenic-containing copper minerals and arsenic-free copper minerals, comprising:

a slurrying step of adding water to the mixture to form a slurry;

a flotation step of adding a flotation reagent containing a collector to the slurry to selectively float the arsenic-containing copper minerals for ore beneficiation, the collector being represented by the following formula (1):

$$R_1—S—R_2 \quad (1)$$

wherein $R_1$ is an alkyl group having 5 to 10 carbon atoms, and $R_2$ is an alkyl group having 1 to 10 carbon atoms; and separating the arsenic-containing copper minerals from a mixture containing the arsenic-containing cooper minerals and the arsenic-free copper minerals.

2. The recovery method according to claim 1, wherein $R_1$ of the collector is a linear alkyl group.

3. The recovery method according to claim 1, wherein $R_2$ of the collector is an alkyl group having 1 or 2 carbon atoms.

4. The recovery method according to claim 1, further comprising a pH adjustment step of adjusting the pH of the slurry between the slurrying step and the flotation step.

5. The recovery method according to claim 1, wherein the arsenic-containing copper minerals contain enargite.

6. The recovery method according to claim 1, wherein the arsenic-free copper minerals contain any one of chalcopyrite, bornite, covellite, and chalcocite, or a combination thereof.

* * * * *